United States Patent
Nozaki

(10) Patent No.: US 7,375,853 B2
(45) Date of Patent: May 20, 2008

(54) IMAGE PROCESSING APPARATUS AND METHOD

(75) Inventor: Yukari Nozaki, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 923 days.

(21) Appl. No.: 10/660,678

(22) Filed: Sep. 12, 2003

(65) Prior Publication Data

US 2004/0125408 A1 Jul. 1, 2004

(30) Foreign Application Priority Data

Sep. 12, 2002 (JP) ............................. 2002-267435

(51) Int. Cl.
- G06K 1/00 (2006.01)
- G06F 15/00 (2006.01)
- G03G 15/041 (2006.01)
- G03G 15/01 (2006.01)
- G03F 3/00 (2006.01)

(52) U.S. Cl. .................. 358/1.9; 358/1.1; 358/1.2; 358/1.4; 358/2.1; 358/3.01; 358/3.1; 358/1.16; 358/500; 358/501; 358/505; 358/515; 358/518; 358/520; 358/521; 358/523; 358/528; 358/529; 358/530; 382/162; 382/163; 382/167; 399/39; 399/54; 399/178; 399/184; 399/223; 399/298

(58) Field of Classification Search .............. 358/1.1, 358/1.2, 1.3, 1.4, 1.9, 3.01, 3.1, 3.21, 1.16, 358/500, 501, 505, 515, 518, 520, 521, 523, 358/525, 528, 529, 530, 2.1; 382/162, 163, 382/167; 399/39, 54, 178, 184, 223, 298

See application file for complete search history.

(56) References Cited

U.S. PATENT DOCUMENTS 4,468,693 A * 8/1984 Fujita et al. ............... 358/525
5,165,071 A * 11/1992 Moriya et al. .............. 358/443
5,576,847 A * 11/1996 Sekine et al. .............. 358/448
5,598,279 A * 1/1997 Ishii et al. .................. 358/402
5,673,116 A * 9/1997 Fukushima ................ 358/3.08

(Continued)

FOREIGN PATENT DOCUMENTS

JP 9-98297 4/1997

(Continued)

OTHER PUBLICATIONS

U.S. Appl. No. 10/098,413, filed Mar. 18, 2002.

(Continued)

*Primary Examiner*—Aung S. Moe
*Assistant Examiner*—Beniyam Menberu
(74) *Attorney, Agent, or Firm*—Oblon, Spivak, McClelland, Maier & Neustadt, P.C.

(57) ABSTRACT

A separating unit determines, for an image data, whether there exists black data, and generates density data from the black data when the black data exists, and generates color data from data other than the black data. A multinarizing unit converts the color data into multinary data. A magnification varying unit varies the density data and the color data multinarized, using a cubic function convolution method. A binarizing unit binarizes the color data varied, based on a predetermined threshold. An image forming unit prints the color data binarized and the density data varied, onto a recording medium.

13 Claims, 12 Drawing Sheets

U.S. PATENT DOCUMENTS

| | | | |
|---|---|---|---|
| 5,699,169 A * | 12/1997 | Nakatani et al. | 358/3.07 |
| 5,740,333 A * | 4/1998 | Yoh et al. | 358/1.9 |
| 5,761,394 A * | 6/1998 | Sugiura et al. | 358/1.9 |
| 5,775,918 A * | 7/1998 | Yanagida et al. | 434/353 |
| 5,892,595 A * | 4/1999 | Yamakawa et al. | 358/530 |
| 5,917,955 A * | 6/1999 | Kojima | 382/266 |
| 6,057,932 A * | 5/2000 | Yoshida et al. | 358/1.9 |
| 6,222,950 B1 * | 4/2001 | Sugiura et al. | 358/1.9 |
| 6,364,452 B1 * | 4/2002 | Noyes et al. | 347/43 |
| 6,501,492 B1 * | 12/2002 | Kunishi et al. | 347/111 |
| 6,765,587 B1 * | 7/2004 | Zhang et al. | 345/606 |

FOREIGN PATENT DOCUMENTS

| | | |
|---|---|---|
| JP | 9-200554 | 7/1997 |
| JP | 10-4490 | 1/1998 |

OTHER PUBLICATIONS

U.S. Appl. No. 10/660,678, filed Sep. 12, 2003, Nozaki.

* cited by examiner

FIG.4

| EXPRESSION (1) | EXPRESSION (2) | EXPRESSION (3) | RESULTS OF DETERMINATION | REMARKS |
|---|---|---|---|---|
| 1 | 1 | NO RELATION | RED | 1 : ESTABLISHED |
| 1 | 0 | NO RELATION | NOT RED | 0 : NOT ESTABLISHED |
| 0 | NO RELATION | 1 | RED | |
| 0 | NO RELATION | 0 | NOT RED | |

FIG.5

| DETERMINATION EXPRESSION | RESULTS | REMARKS |
|---|---|---|
| $(2R+5G+B)/8 > Kth$ | WHITE | Kth : THRESHOLD VALUE FOR DETERMINING IF DATA IS WHITE OR BLACK BASED ON LUMINANCE |
| $(2R+5G+B)/8 \leq Kth$ | BLACK | |

FIG.6

|   | 1 | 2 | 3 | 4 | 5 |
|---|---|---|---|---|---|
| 1 | 11 | 12 | 13 | 14 | 15 |
| 2 | 21 | 22 | 23 | 24 | 25 |
| 3 | 31 | 32 | 33 | 34 | 35 |
| 4 | 41 | 42 | 43 | 44 | 45 |
| 5 | 51 | 52 | 53 | 54 | 55 |

FIG. 7

HORIZONTAL  LP1 | 31 | 32 | 33 | 34 |    LP2 | 35 | 34 | 33 | 32 |

VERTICAL    LP3 | 13 | 23 | 33 | 43 |    LP4 | 53 | 43 | 33 | 23 |

SLANTING    LP5 | 11 | 22 | 33 | 44 |    LP6 | 55 | 44 | 33 | 22 |

SLANTING    LP7 | 15 | 24 | 33 | 42 |    LP8 | 51 | 42 | 33 | 24 |

FIG.11
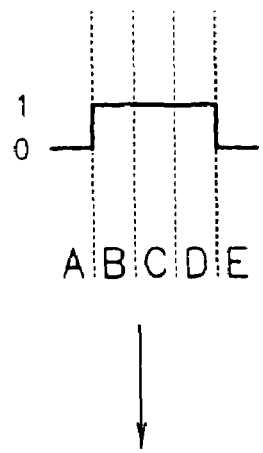
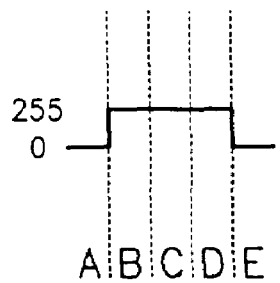
FIG.12
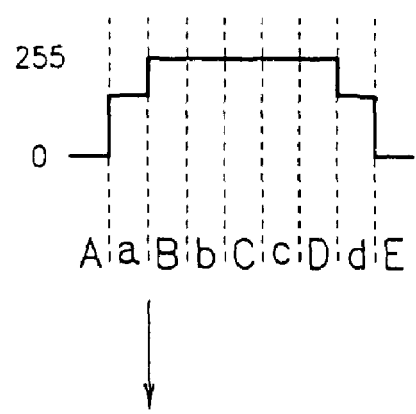
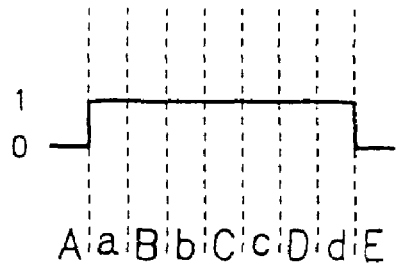

IMAGE PROCESSING APPARATUS AND METHOD

BACKGROUND OF THE INVENTION

1) Field of the Invention

The present invention relates to a technology for reading a color image through a scanner to reproduce the image on a transfer paper in two colors of red and black.

2) Description of the Related Art

Multifunction peripherals that functions as printer, copier, facsimile, and scanner are known. Moreover, multifunction peripherals that form two-color images are also known.

Top row in FIG. 14 illustrates a pixel string with pixels A to G spaced at intervals of T and bottom row illustrates the same pixel string when the number of pixels in the pixel string is reduced to 80%. It is common to use the cubic convolution method to perform increase and/or reduction of pixels, because, this method is accurate. In this method, four consecutive pixels are selected from the pixel string as sampling pixels, and a virtual pixel that is a pixel after increase and/or reduction of pixels is obtained by using a cubic function as a distance parameter.

If the pixels that are at interval T in the pixel string shown in FIG. 14 are to be reduced to 80%, the interval between two virtual pixels will be 100/80=1.25T. For example, a virtual pixel $\alpha$ is obtained by using a cubic function G (x) (not shown) and four pixels A, B, C, and D as sampling pixels.

FIG. 15 illustrates how data is generated in varying processing in the apparatus that reproduces an image in two colors. The original color data is converted into binary color data, and the original density data is converted into binary density data. However, if an unbalance is generated between the original color data and the binary color data or the original density data or the binary density data, the desired image is not produced after the varying processing.

Suppose the cubic function convolution method is used for varying processing of the density data and simple interpolation, which does not take into consideration the phase component, is used for varying processing of color data. The density data at a virtual pixel (B) between the sampling pixel (A) as black and a sampling pixel as any other color each identified by a color identifying unit is calculated using information for four pixels forward and backward from the virtual pixel B. On the other hand, the color data is calculated using information for one forward pixel.

Therefore, a black pixel "a" is generated unlike the original image. This represents a shift between the color data and the density data.

SUMMARY OF THE INVENTION

It is an object of the present invention to solve at least the problems in the conventional art.

An image processing apparatus according to one aspect of the present invention includes image reading means for reading analog color image data of a color image, separates the analog color image data into red image data, green image data, and blue image data, and converts the red image data into digital red image data, the green image data into digital green image data, and the blue image data into digital blue image data; and processing means for subjecting the digital red image data, the digital green image data, and the digital blue image data to digital processing. The processing means includes color identifying means for determining, for each of the digital red image data, the digital green image data, and the digital blue image data, whether there exists black data, and generates density data from the black data when black data exists, and generates color data from data other than the black data; multinarizing means for converting the color data for each of the digital red image data, the digital green image data, and the digital blue image data into multinary data; magnification varying means for varying the density data and the color data multinarized, using a cubic function convolution method; binarizing means for binarizing the color data varied, based on a predetermined threshold; and image printing means for printing the color data binarized and the density data varied, onto a recording medium.

An image processing apparatus according to another aspect of the present invention includes an image reader that reads analog color image data of a color image, separates the analog color image data into red image data, green image data, and blue image data, and converts the red image data into digital red image data, the green image data into digital green image data, and the blue image data into digital blue image data; an image processor that subjects the digital red image data, the digital green image data, and the digital blue image data to digital processing. The image processor includes a separating unit that determines, for each of the digital red image data, the digital green image data, and the digital blue image data, whether there exists black data, and generates density data from the black data when black data exists, and generates color data from data other than the black data; and a two-color image processing unit that includes a multinarizing unit that converts the color data for each of the digital red image data, the digital green image data, and the digital blue image data into multinary data; a magnification varying unit that varies the density data and the color data multinarized, using a cubic function convolution method; and a binarizing unit that binarizes the color data varied, based on a predetermined threshold. An image forming unit that prints the color data binarized and the density data varied, onto a recording medium.

An image processing method according to still another aspect of the present invention includes reading analog color image data of a color image, separates the analog color image data into red image data, green image data, and blue image data and converting the red image data into digital red image data, the green image data into digital green image data, and the blue image data into digital blue image data; determining, for each of the digital red image data, the digital green image data, and the digital blue image data, whether there exists black data, and generating density data from the black data when black data exists, and generating color data from data other than the black data; converting the color data for each of the digital red image data, the digital green image data, and the digital blue image data into multinary data; varying the density data and the color data multinarized, using a cubic function convolution method; binarizing the color data varied, based on a predetermined threshold; and printing the color data binarized and the density data varied, onto a recording medium.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 illustrates how to determine whether the image data is red or not;

FIG. 5 illustrates how to determine whether the image data is black or white;

FIG. 6 is a matrix used for correction to color shift;

FIG. 7 illustrates linear patterns created based on the matrix of FIG. 6;

FIG. 11 illustrates the processing performed in a multinarizing unit;

FIG. 12 illustrates the processing performed in a binarizing unit;

DETAILED DESCRIPTION

Exemplary embodiments of the present invention will be explained below with reference to the accompanying drawings.

Figure 1:
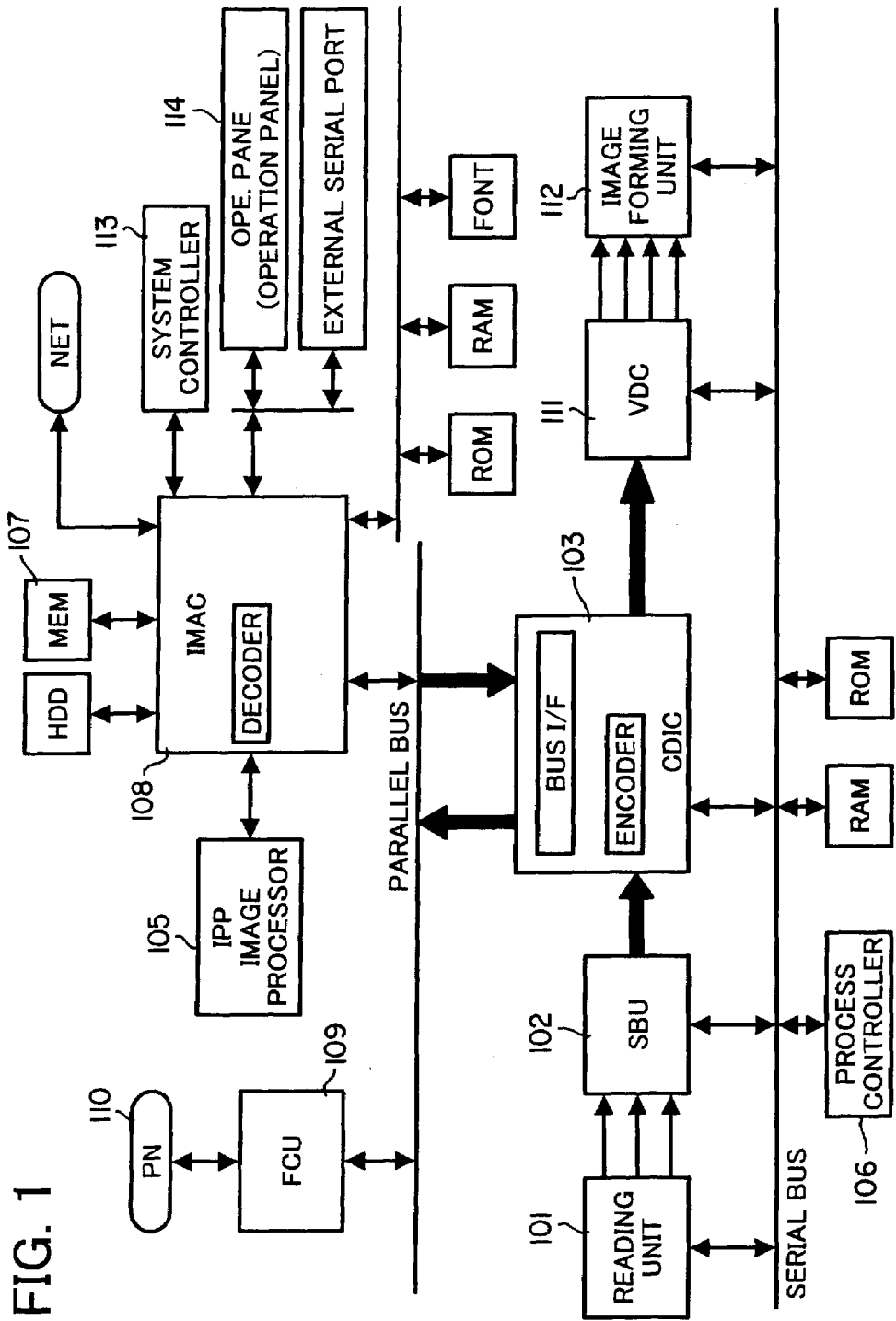
FIG. 1 is a block diagram of a whole configuration of a multifunction peripheral or an image processing apparatus according to one embodiment of the present invention.
Figure 8:
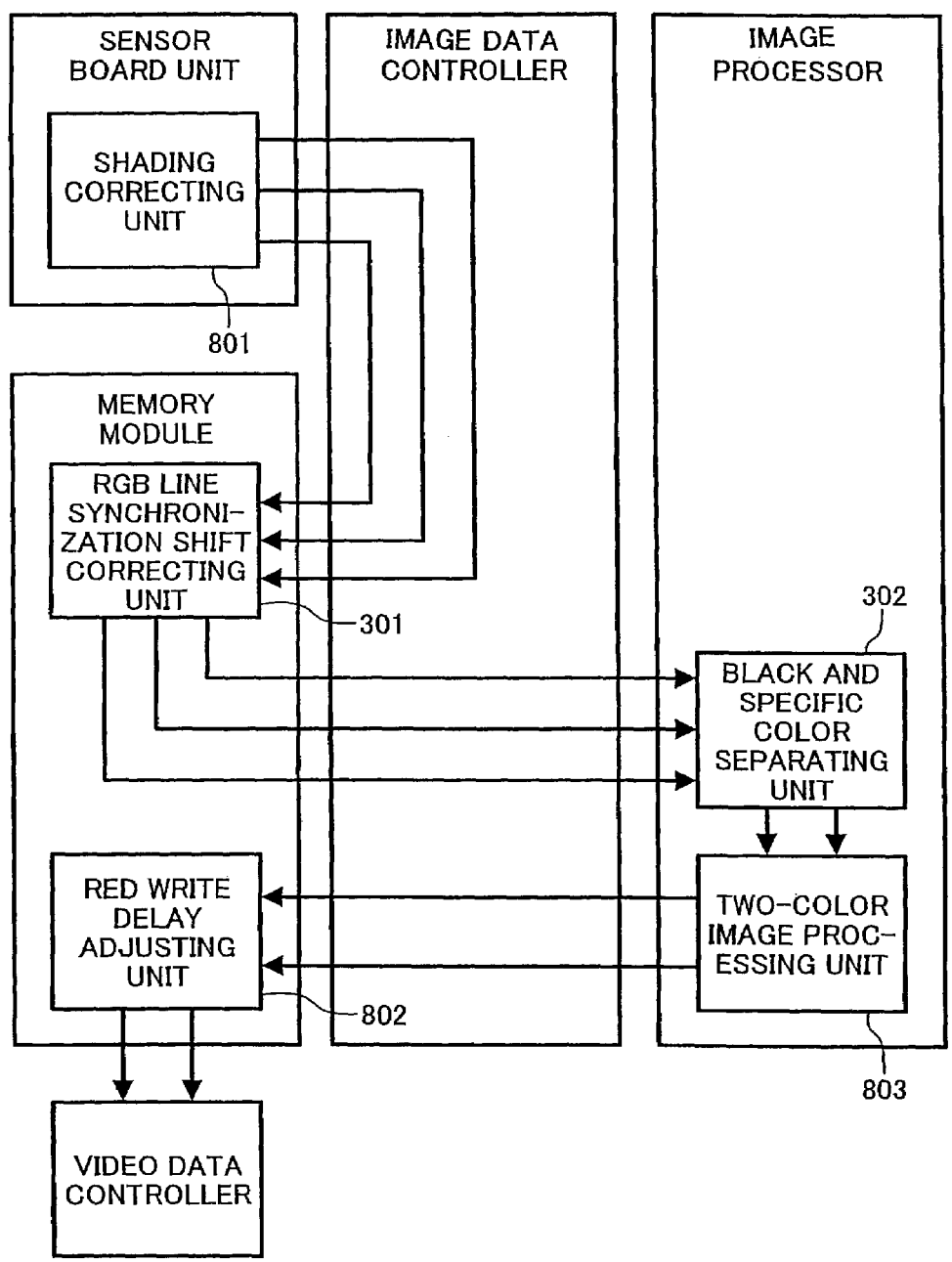
FIG. 8 is a block diagram of the image processing apparatus.

FIG. 1 is a block diagram of a whole configuration of an image processing apparatus according to one embodiment of the present invention. FIG. 8 is a block diagram of a key configuration of the image processing apparatus and illustrates a configuration of a multifunction peripheral (MFP) capable of two-color copying (e.g., red and black) on up to a A2-size sheet of paper. It is noted that the multifunction peripheral is exemplified in the embodiment of the present invention, but the present invention is applicable to image forming apparatuses such as copiers, printers, and facsimiles.

A reading unit 101 that optically reads a document focuses light reflected by lamp from the document on a light receiving element through a mirror and a lens. The light receiving element (as a charge-coupled device (CCD) in the embodiment) is mounted on a sensor board unit 102 (hereinafter, referred to as SBU). The CCD is a three linear CCD image sensor that converts image formation for the document into electrical signals corresponding to respective colors through red (R), green (G), and blue (B) filters. An A/D converter converts the signals output from the CCD image sensor into digital image data, and the SBU outputs image signals for the data together with synchronization signals.

The image signals output from the SBU are input into a unit 103 (an image data controller or a color data interface controller, hereinafter, referred to as CDIC) that integrally controls digital signal-bus interface, and shares the processing for the digital signals. The CDIC controls the whole transmission of image data between functional devices and a data bus. The CDIC performs data transfer among the SBU, a parallel bus, and a programmable arithmetic processing unit 105 (an image processor or image processing peripheral, hereinafter, referred to as IPP) that subjects the digitized image signals to image processing. The CDIC also performs communications between a system controller 113 that controls the whole system of the embodiment and a process controller 106 for the image data.

As for the digital image data for A-to-D converted R, G, and B, non-uniformity (signal degradation in a scanner system) of the data due to an optical system is corrected in the SBU in this embodiment. The digital image data for R, G, and B of which non-uniformity has been corrected is input into an RGB line synchronization shift correcting unit 301 of a unit (a memory module, hereinafter, referred to as MEM) that integrally controls the SBU, CDIC, or access of digital signals to memory. The unit corrects a synchronization shift between the image data for colors. In this embodiment, since scanning is carried out by the CCD with three lines, synchronization shifts among 12 lines are produced in the colors. The SBU or CDIC in this embodiment generates a multinary luminance signal for a target pixel and a color determination signal indicating whether the target pixel is red based on the R, G, and B digital image data.

Figure 3:
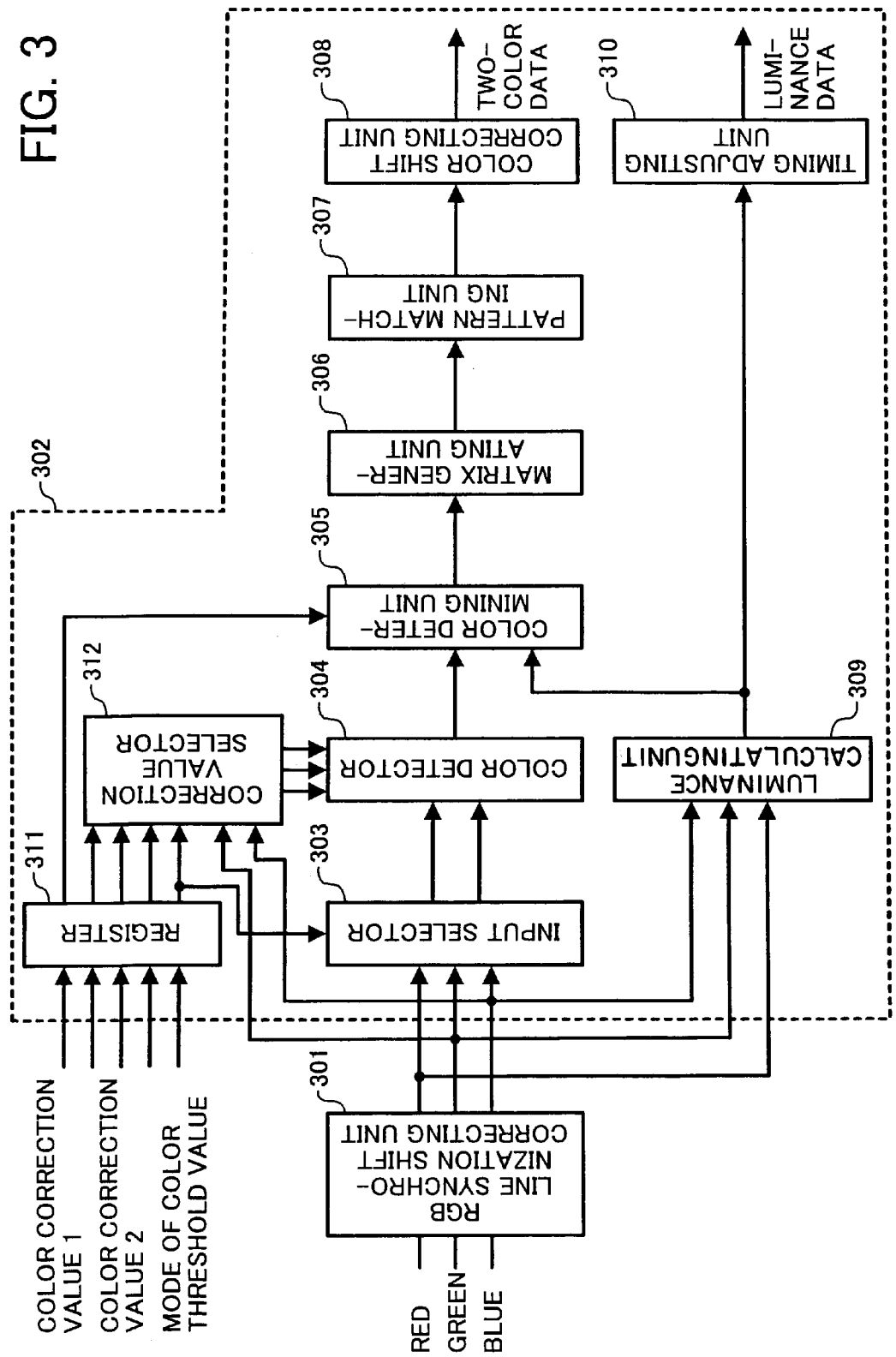
FIG. 3 is a block diagram illustrating a configuration for performing the processing shown in FIG. 2.

FIG. 3 is a block diagram illustrating a configuration for performing the processing such that three-color image data for R, G, and B is converted to image data for black and any color other than black. A black and specific color separating unit 302 includes a register 311, a correction value selector 312, an input selector 303, a color detector 304, a color determining unit 305, a matrix generating unit 306, a pattern matching unit 307, a color shift correcting unit 308, a luminance calculating unit 309, and a timing adjusting unit 310.

The register 311 previously stores a correction value 1 and a correction value 2 used for detecting red in the black and specific color separating unit 302, a threshold value of green, a threshold value of luminance for determining white or black, and information for process modes (mode for forming a two-color image of black and red, or mode for forming a two-color image of black and blue). The correction value selector 312 selects any of values stored in the register 311 according to a process mode or a level, and inputs the value to the color detector 304.

Figure 2:
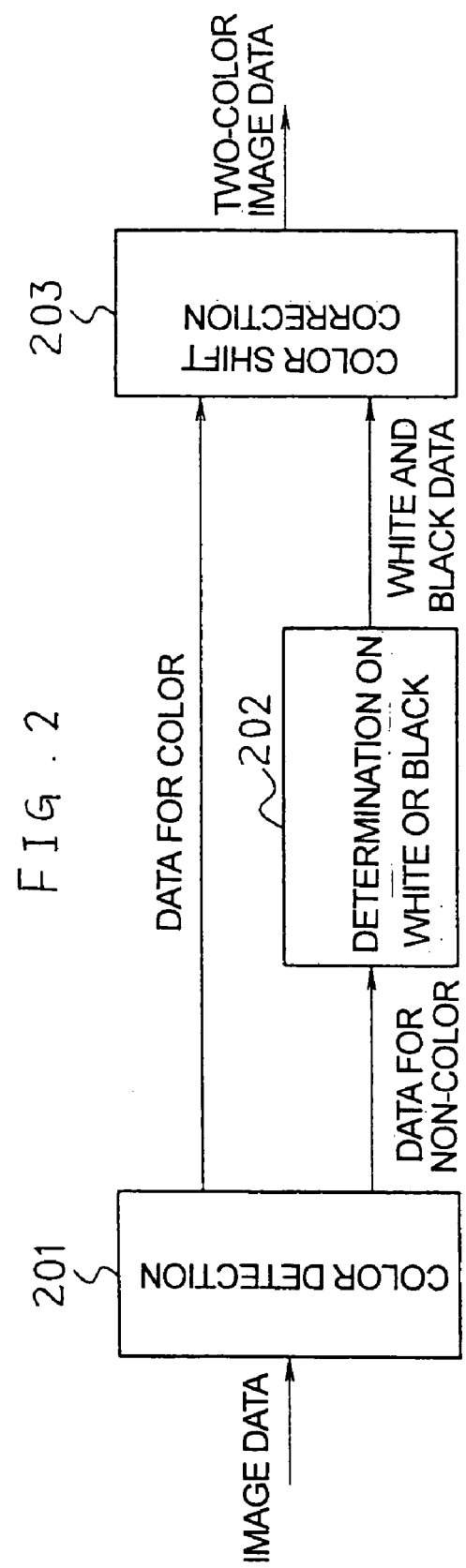
FIG. 2 is a block diagram illustrating a sequence of converting image data for three colors of red (R), green (G), and blue (B) into image data for black and any color other than black.

The input selector 303 selects two image data required for processing from the image data for R, G, and B based on the data for mode stored in the register 311. The color detector 304 detects red from the selected two image data. In the image processing apparatus of the embodiment, processing for color detection 201 shown in FIG. 2 is executed in the input selector 303 and the color detector 304.

The processing for color detection 201 when red is to be detected will be explained below. The input selector 303 selects image data for R and image data for G from the R, G, and B image data, and inputs the selected image data to the color detector 304. The correction value selector 312 selects the correction value 1 for red and the correction value 2 for red each of which is used for detecting red, and the threshold value of green, and outputs the selected values to the color detector 304. The color detector 304 substitutes the input R and G image data in expression (1) through expression (3) explained below, and determines if the input image data is red according to whether the conditions of the expressions (1) to (3) are satisfied.

$$G > KG \quad (1)$$

$$R > G + KR1 \quad (2)$$

$$R > G + KR2 \quad (3)$$

where R is image data (light quantity signal) for red, G is image data (light quantity signal) for green, KG is a threshold value of green, KR1 is a correction value 1 of red, and KR2 is a correction value 2 of red. It is noted that a relation between the conditions of the expressions (1) to (3) and results of determination is as shown in FIG. 4.

If the mode for forming a white or black image is set in the image processing apparatus, the color detector 304 determines whether the image data is black or white (see a box labeled determination on white or black 202 in FIG. 2) based on determination expressions shown in FIG. 5.

The luminance calculating unit 309 receives the R, G, and B image data and calculates each luminance value of the image data. The results of the calculation are input into the color determining unit 305 and the timing adjusting unit 310. The timing adjusting unit 310 outputs luminance data at a timing at which the color shift correcting unit explained later outputs two-color data.

The color determining unit 305 reads the threshold value of the luminance from the register 311, compares the value with the calculated results in the luminance calculating unit 309, and determines whether each pixel is red, black, or white. The color determining unit 305 then outputs the results of determination to the matrix generating unit 306 as signals indicating red, black, and white. The matrix generating unit 306 receives the signals, stores the signals for five lines, and forms a 5×5 matrix as shown in FIG. 6. Each of values 11, 12, 13 . . . forming the matrix corresponds to one pixel.

The matrix generating unit 306 determines a pixel 33 in the 5×5 matrix as a target pixel, and forms a linear line consisting of four pixels including the pixel 33 as the third pixel. By obtaining linear lines in vertical, horizontal, and slanting directions, eight types of linear line patterns (from LP1 to LP8) in total are formed. FIG. 7 illustrates the eight linear line patterns.

The pattern matching unit 307 receives the patterns from LP1 to LP8, and compares the LP1 to LP8 with the preset reference pattern. The pattern matching unit 307 then determines whether each of the patterns from LP1 to LP8 matches the reference pattern, and outputs results of determination to the color shift correcting unit 308.

The color shift correcting unit 308 is the unit that performs the color shift correction 203 (see FIG. 2). If each of the patterns from LP1 to LP8 matches the reference pattern, the color shift correcting unit 308 determines that the target pixel included in a linear line pattern matching the reference pattern is color-shifted, and changes the color of the target pixel (e.g., red to black, black to red) according to a preset procedure. The image data of which color shift has been corrected is output from the color shift correcting unit 308 as two-color data forming two-color image of black and red.

Subsequently, the IPP separates the red digital image signal from the black digital image signal, subjects the signals to predetermined image processing, and stores them in the memory module 107 (hereinafter, referred to as MEM) through the CDIC. A flow of the image data is explained below. The flow is shown in a case where the image data is stored in memory, and additional processing such as rotation of the data in an image orientation or image synthesis required when the image is to be read. The data transferred from the IPP to the CDIC is sent from the CDIC to an image memory access controller 108 (IMAC) through a parallel bus. The IMAC performs access controls of the image data to the MEM, expands data for printing of an external PC (information processing terminal), and compresses and decompresses the image data for making effective used of the memory under the control of the system controller. The data transferred to the IMAC is compressed, stored in the MEM, and the stored data is read as required. The read data is decompressed to be restored to the original image data, and this data is returned from the IMAC to the CDIC through the parallel bus. The data transferred from the CDIC to the IPP is subjected to image quality processing and is pulse-controlled in a video data controller (VDC), and an image forming unit forms a reproduced image on a transfer paper.

Figure 9:
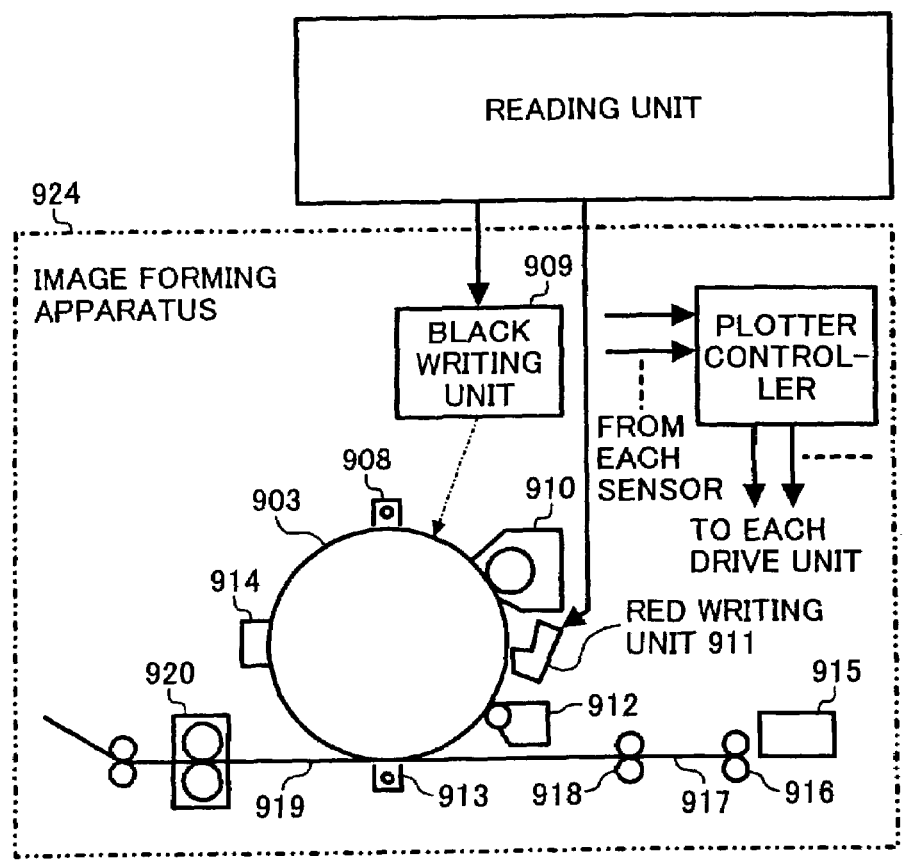
FIG. 9 is a detailed illustration of a VDC and an image forming unit.

FIG. 9 is a detailed diagram of the VDC and the image forming unit 924. The image forming unit includes a photoreceptor 903 around which a charger 908 as a charging unit, a first exposing device such as a black writing unit 909 as a deflective scanning type exposing unit, a developing device 910 as a first developing unit that uses black toner, a second exposing device such as a red writing unit 911 as a linear type exposing unit, a developing device 912 as a second developing unit that uses red toner, a transfer charger 913, and a cleaning device 914 are sequentially arranged. That is, the first exposing device such as the black writing unit 909 and the second exposing device such as the red writing unit 911 are disposed on discrete positions around the periphery of the photoreceptor 903 so as to form latent images. Timing is adjusted so that the image data for red color, of the image data for black and red colors, is output to the second exposing device such as the red writing unit 911 at a timing slightly delayed from the image data for black color.

The first exposing device such as the black writing unit 909 forms an electrostatic latent image formed on the photoreceptor 903 that is uniformly charged by the charger 908, and the first developing device 910 develops the latent image with black toner. The second exposing device such as the red writing unit 911 forms an electrostatic latent image on the photoreceptor 903 and the second developing device 912 develops the latent image with red toner. Paper feed rollers 916 feed a transfer paper 917 from a paper feed tray 915, and registration rollers 918 once stop the paper 917 and feed it to a transfer portion including the transfer charger 913 at a timing at which the paper is registered with a front edge of a toner image. A transfer belt 919 transfers the paper 917 from the transfer portion to a fixing device 920. The paper 917 is subjected to fixing processing, and is ejected or transferred to be fed again. In such a manner, a 2-color image of black and red is formed.

In the flow of the image data in FIG. 1, the functions of the multifunction peripheral can be achieved through the parallel bus and the bus controlled by the CDIC.

A facsimile transmission function is performed by subjecting read image data to image processing in the IPP and transferring the image data to a facsimile control unit 109 (hereinafter, referred to as FCU) through the CDIC and the parallel bus. The FCU converts the data to data for a communication network and transmits the data to a public network 110 (hereinafter, referred to as PN) as facsimile data.

Through facsimile reception, line data from the PN is converted to image data at the FCU, and transferred to the IPP through the parallel bus and the CDIC. In this case, the image data is not subjected to any particular image processing, but dots are re-arranged and pulses are controlled at the VDC 111 to form a reproduced image on a transfer paper in the image forming unit 112.

The system controller 113 and the process controller 106 perform control for allocation of the reading unit, the image forming unit, and using right of parallel bus to jobs under the situations in which a plurality of jobs, for example, a copying function, a facsimile transmission/reception function, and a printer output function operate in parallel with each other. The process controller controls the flow of the image data, and the system controller controls the whole system and manages startup of each resource. Any of the functions of the multifunction peripheral is selected through an operation panel 114 (Ope. Pane) to set contents of processing for a copying function, a facsimile function, or the like. The system controller and the process controller mutually perform communications through the parallel bus, the CDIC, and a serial bus. The CDIC converts data format for data interface between the parallel bus and the serial bus. The light receiving element in the embodiment is the three linear image sensor of R, G, and B, but two linear image sensor of R and G may be used in an apparatus for reproduction of the data in two colors of red and black.

Figure 10:
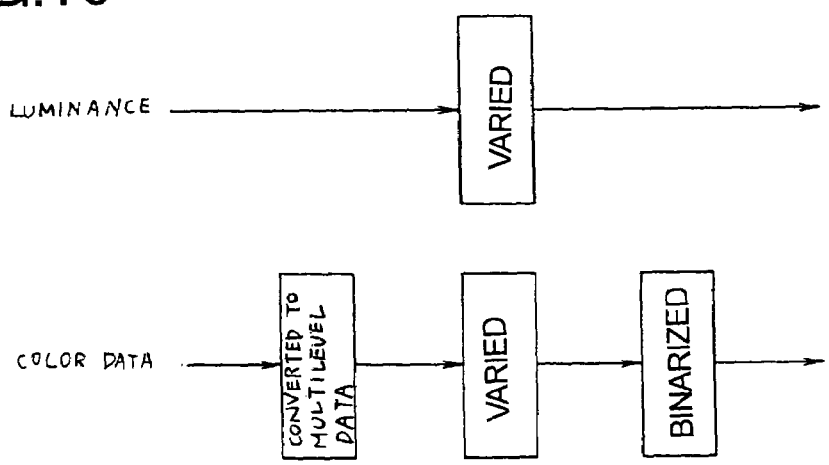
FIG. 10 is a block diagram illustrating varying processing of color data and density data.

FIG. 10 is a block diagram illustrating a varying processing of color data and density data. A two-color image processing unit 803 in the image processor as shown in FIG. 8 performs the varying processing on color data and density data. The two-color image processing unit 803 includes a multinarizing unit, a magnification varying unit, and a binarizing unit. The density data is varied in the magnification varying unit, and the color data is converted to multinary data in the multinarizing unit, and is binarized in the binarizing unit based on predetermined threshold values.

FIG. 11 illustrates the multinarizing unit for color data. If the input color data is 0, the multinarizing unit outputs 0, and outputs 255 if it is 1.

FIG. 12 illustrates the binarizing unit for color data. If the input color data is 0, the binarizing unit outputs 0, and outputs 1 if it is not 0.

Figure 13:
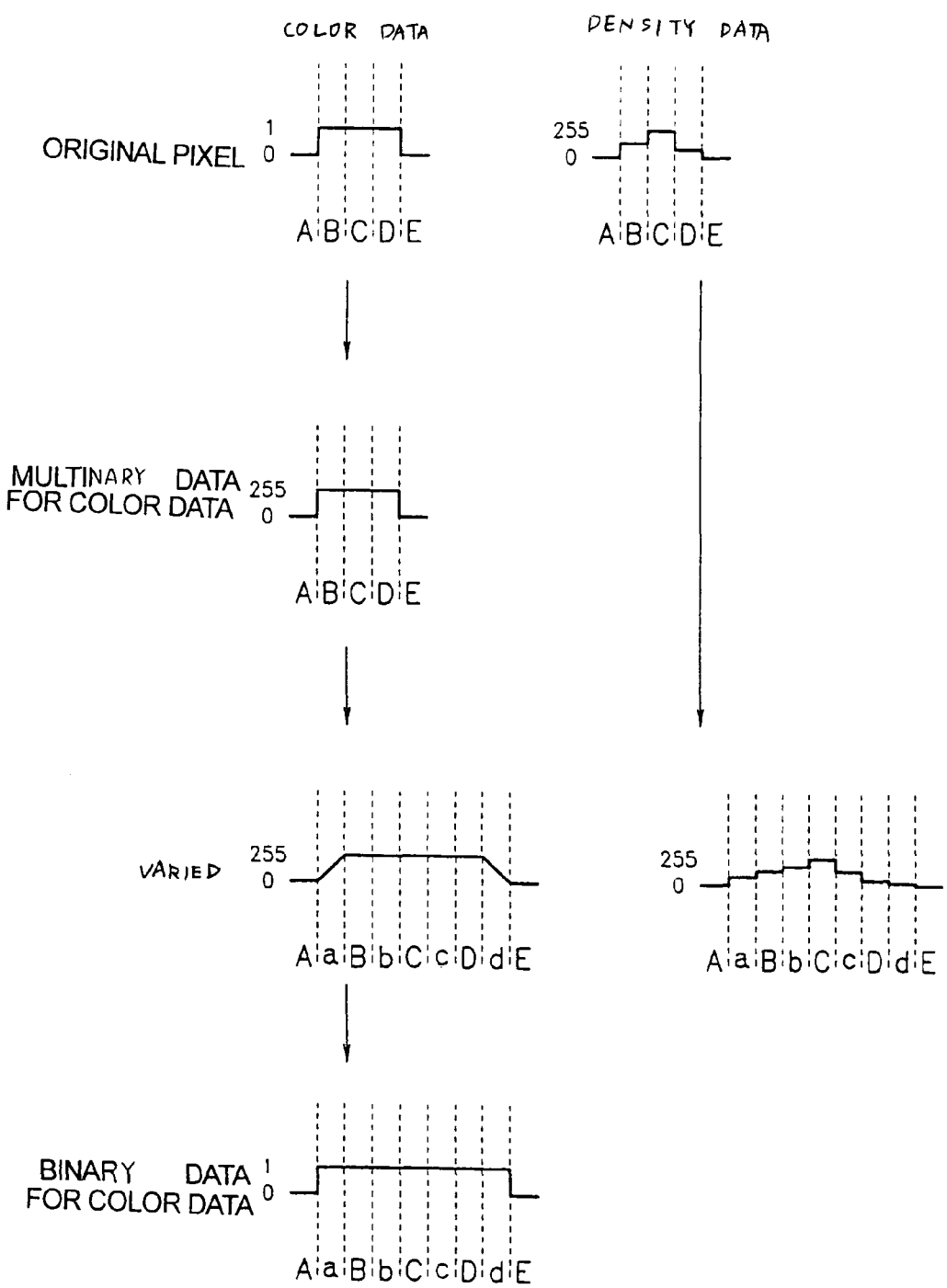
FIG. 13 illustrates the varying processing of color data and density data.
Figure 14:
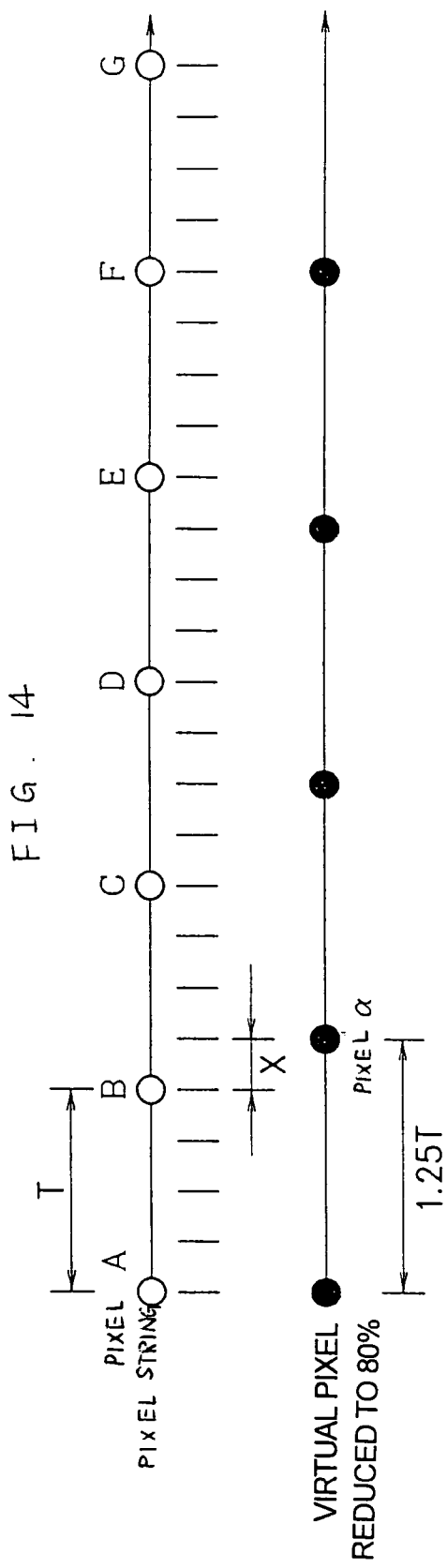
FIG. 14 is an illustration of virtual pixels and positions thereof when a pixel string aligned at intervals of T is reduced to 80%.
Figure 15:
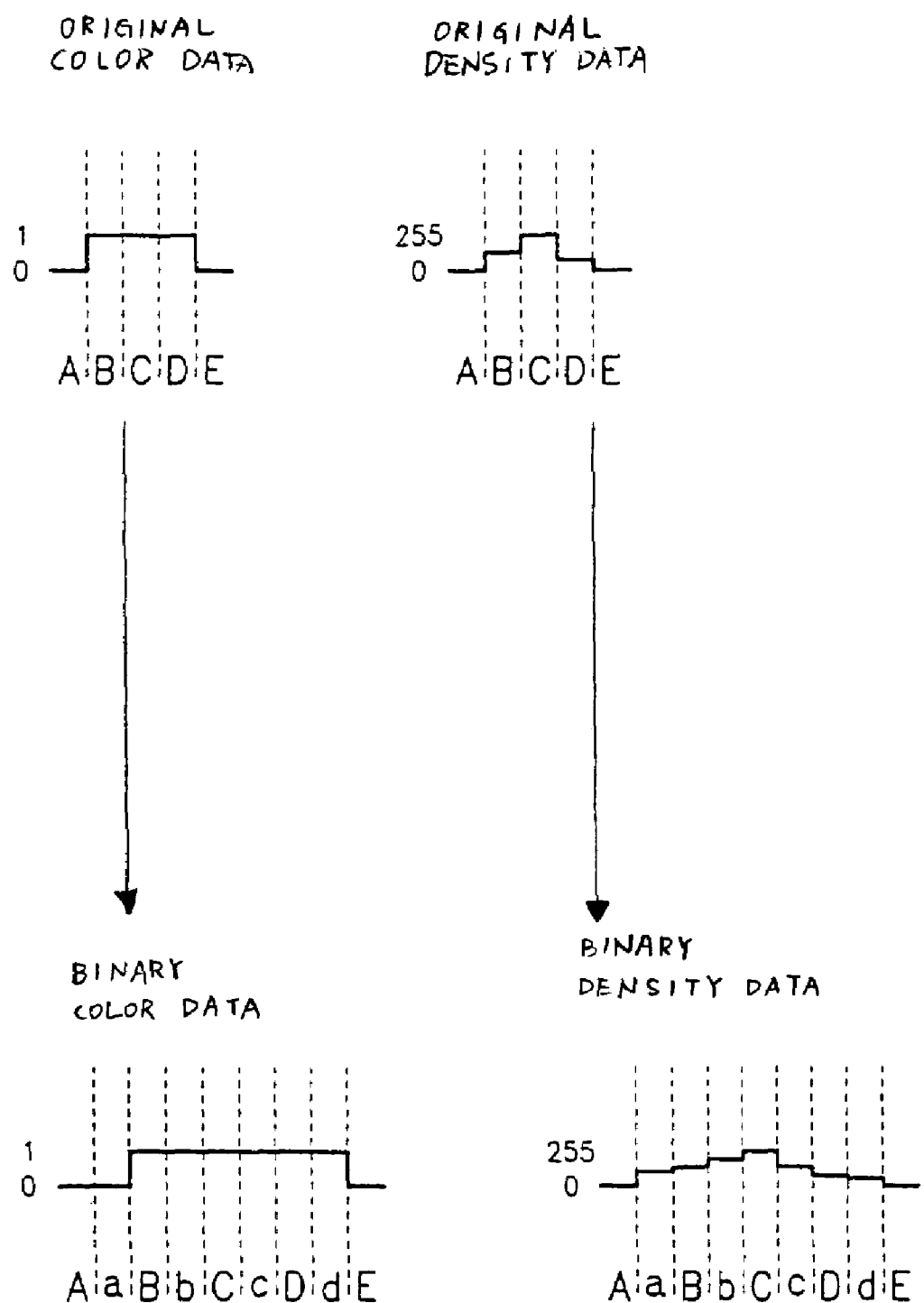
FIG. 15 illustrates the varying processing of a device that reproduces an image in two colors.

FIG. 13 illustrates the varying processing of color data and density data. If the density data is varied using the cubic function convolution method, a virtual pixel (a) is affected by a sampling pixel B identified as any color other than black. More specifically, the pixel (a) is between a sampling pixel A as black and the sampling pixel B identified in the black and specific color separating unit 302. If the color data for the virtual pixel is black, a black pixel is formed, and this black pixel does not exist in the original image. Therefore, the color data for the virtual pixel needs to be changed to a color other than black. The color data is converted to multinary data in the multinarizing unit, and is varied by the cubic function convolution method.

The color data for a virtual pixel is 0 if the virtual pixel exists between a sampling pixel as black and a sampling pixel as black each identified in the black and specific color separating unit 302. The color data for a virtual pixel is 255 if the virtual pixel exists between a sampling pixel as a color other than black and a sampling pixel as a color other than black each identified in the color identifying unit. The color data for a virtual pixel is a value greater than 0 regardless of parameters if the virtual pixel exists between a sampling pixel as black and a sampling pixel as a color other than black each identified in the color identifying unit. By setting the threshold value of the binarizing unit to 0, if the color data is greater than 0, then the color is any color other than black, and if it is 0, then the color is black. Therefore, displacement does not occur between the color data and the density data.

The data is sequentially processed in the multinarizing unit, the magnification varying unit, and the binarizing unit. Therefore, in the image processing apparatus that converts the color image into two-color image of a specific color and black, displacement due to a virtual pixel does not occur between the color data and the density data.

The present document incorporates by reference the entire contents of Japanese priority document, 2002-267435 filed in Japan on Sep. 12, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:

image reading means for reading analog color image data of a color image, separating the analog color image data into red image data, green image data, and blue image data, and converting the red image data into digital red image data, the green image data into digital green image data, and the blue image data into digital blue image data; and processing means for subjecting the digital red image data, the digital green image data, and the digital blue image data to digital processing, wherein the processing means includes color identifying means for determining, for each of the digital red image data, the digital green image data, and the digital blue image data, whether there exists black data, generating density data from the black data when black data exists, and generating color data from data other than the black data;

multinarizing means for converting the color data for each of the digital red image data, the digital green image data, and the digital blue image data into multinary color data;

magnification varying means for varying the density data and the multinary color data, using a cubic function convolution method;

binarizing means for binarizing the varied multinary color data, based on a predetermined threshold; and image printing means for printing the binarized varied multinary color data and the varied density data, onto a recording medium.

2. The image processing apparatus according to claim 1, wherein the multinarizing means generates the multinary color data by setting "0" where the black data exists and by setting an integer equal to or greater than "1" when the data is other than the black data.

3. The image processing apparatus according to claim 1, wherein the binarizing means binarizes the varied multinary color data by setting to black when the varied multinary color data is "0" and by setting to any color other than black when the varied multinary color data is not "0".

4. An image processing apparatus, comprising:

an image reader that reads analog color image data of a color image, separates the analog color image data into red image data, green image data, and blue image data, and converts the red image data into digital red image data, the green image data into digital green image data, and the blue image data into digital blue image data;

an image processor that subjects the digital red image data, the digital green image data, and the digital blue image data to digital processing, wherein the image processor includes a separating unit that determines, for each of the digital red image data, the digital green image data, and the digital blue image data, whether there exists black data, generates density data from the black data when black data exists, and generates color data from data other than the black data; and a two-color image processing unit that includes a multinarizing unit that converts the color data for each of the digital red image data, the digital green image data, and the digital blue image data into multinary color data;

a magnification varying unit that varies the density data and the multinary color data, using a cubic function convolution method; and a binarizing unit that binarizes the varied multinary color data, based on a predetermined threshold; and an image forming unit that prints the binarized varied multinary color data and the varied density data, onto a recording medium.

5. The image processing apparatus according to claim 4, wherein the multinarizing unit generates the multinary color data by setting "0" where the black data exists and by setting an integer equal to or greater than "1" when the data is other than the black data.

6. The image processing apparatus according to claim 4, wherein the binarizing unit binarizes the varied multinary color data by setting to black when the varied multinary color data varied is "0" and by setting to any color other than black when the varied multinary color data is not "0".

7. The image processing apparatus according to claim 4, wherein the separating unit further includes a register that previously stores correction values for detecting any color other than black, threshold values of luminance for determining whether data is white or black, and information for process modes;

a correction value selector that selects any of the threshold values stored in the register according to the process modes;

an input selector that selects two image data from the digital red, green and blue image data based on the process modes; and a color detector that detects any color other than black from the selected two image data.

8. The image processing apparatus according to claim 7, wherein the separating unit further includes a luminance calculating unit that receives the digital red, green and blue image data and calculates a luminance value of each of the digital red, green and blue image data; and a color determining unit that reads the threshold value of the luminance from the register, and compares the read threshold value with a calculated value to determine each pixel as black, white, or any other color, and outputs image signals.

9. The image processing apparatus according to claim 8, wherein the separating unit further includes a matrix generating unit that receives the image signals outputted from the color determining unit, accumulates signals for five lines to generate a 5×5 matrix, and generates linear line patterns from the matrix;

a pattern matching unit that compares each of the linear line patterns with a preset reference pattern, and determines if each of the linear line patterns matches the reference pattern; and a color shift correcting unit that determines, when the pattern in the linear line patterns matches the reference pattern, a target pixel included in the linear line pattern as color shift, changes a color of the target pixel to another color, and outputs the color data in which color shift has been corrected as two-color data.

10. The image processing apparatus according to claim 9, wherein the separating unit further includes a timing adjusting unit that outputs luminance data at a timing at which the color shift correcting unit outputs the two-color data.

11. An image processing method, comprising:

reading analog color image data of a color image, separating the analog color image data into red image data, green image data, and blue image data, and converting the red image data into digital red image data, the green image data into digital green image data, and the blue image data into digital blue image data;

determining, for each of the digital red image data, the digital green image data, and the digital blue image data, whether there exists black data, and generating density data from the black data when black data exists, and generating color data from data other than the black data;

converting the color data for each of the digital red image data, the digital green image data, and the digital blue image data into multinary color data;

varying the density data and the multinary color data, using a cubic function convolution method;

binarizing the varied multinary color data, based on a predetermined threshold; and printing the binarized varied multinary color data and the varied density data, onto a recording medium.

12. The method according to claim 11, wherein the converting includes generating the multinary color data by setting "0" where the black data exists and by setting an integer equal to or greater than "1" when the data is other than the black data.

13. The method according to claim 11, wherein the binarizing includes setting to black when the varied multinary color data is "0" and setting to any color other than black when the varied multinary color data is not "0".

* * * * *